United States Patent
Prahst

(10) Patent No.: US 7,100,748 B2
(45) Date of Patent: Sep. 5, 2006

(54) INTERNALLY VENTILATED BRAKE DISK WITH CURVED COOLING AIR DUCTS

(75) Inventor: Alexander Prahst, Ebersbach (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 10/771,144

(22) Filed: Feb. 4, 2004

(65) Prior Publication Data

US 2004/0216969 A1 Nov. 4, 2004

(30) Foreign Application Priority Data

Feb. 4, 2003 (DE) .................. 103 04 299

(51) Int. Cl.
*F16D 65/12* (2006.01)

(52) U.S. Cl. .............................. 188/218 XL

(58) Field of Classification Search ......... 188/218 XL, 188/264 A, 264 AA
See application file for complete search history.

(56) References Cited

U.S. PATENT DOCUMENTS

| 3,298,476 | A | * | 1/1967 | Day ....................... 188/218 A |
| 5,427,212 | A | * | 6/1995 | Shimazu et al. ...... 188/218 XL |
| 5,526,905 | A | * | 6/1996 | Shimazu et al. ...... 188/218 XL |
| 6,086,814 | A | | 7/2000 | Krenkel et al. |
| 6,308,808 | B1 | * | 10/2001 | Krenkel et al. ....... 188/218 XL |
| 6,386,341 | B1 | * | 5/2002 | Martin .................. 188/218 XL |
| 6,739,437 | B1 | * | 5/2004 | Garfinkel et al. ..... 188/218 XL |
| 2001/0002638 | A1 | | 6/2001 | Kobayashi |
| 2004/0040802 | A1 | * | 3/2004 | Veneziano et al. .... 188/218 XL |

FOREIGN PATENT DOCUMENTS

| DE | 1 038 593 | 9/1958 |
| DE | 22 57 176 | 3/1979 |
| DE | 44 38 455 | 5/1996 |
| EP | 0717214 | 6/1996 |
| EP | 0179135 | 2/2001 |
| FR | 1 180 373 | 6/1959 |
| GB | 1 421 952 | 1/1976 |
| GB | 2 024 966 | 1/1980 |
| GB | 2 293 866 | 4/1996 |

* cited by examiner

*Primary Examiner*—Devon C. Kramer
(74) *Attorney, Agent, or Firm*—Crowell & Moring LLP

(57) ABSTRACT

An internally ventilated brake disk has two friction rings which are mutually connected by way of webs, ducts for conducting cooling air being formed between the webs and the two friction rings, and the webs extending in a curved manner between their end regions. End region of the webs, which point to an outer circumference region of the brake disk, are essentially radially aligned with respect to the brake disk and end region of the webs pointing to an inner circumference side of the brake disk are set at an angle of from 20° to 70°, preferably 30° to 60° C., with respect to a tangent ray applied to this point on the brake disk and pointing against the rotating direction of the brake disk.

7 Claims, 3 Drawing Sheets

INTERNALLY VENTILATED BRAKE DISK WITH CURVED COOLING AIR DUCTS

BACKGROUND AND SUMMARY OF THE INVENTION

This application claims the priority of German Application No. 103 04 299.7 filed on Feb. 4, 2003, the disclosure of which is expressly incorporated by reference herein.

The invention relates to an internally ventilated brake disk comprising two friction rings which are mutually connected by way of webs ducts for conducting cooling air being formed between the webs and the two friction rings with the webs extending in a curved manner between their end regions.

Internally ventilated brake disks with curved cooling air ducts are known. Thus, French Patent Document FR-PS 11 80 373 shows an internally ventilated brake disk for a retarder brake with cooling air ducts which are curved in a blade-type manner. From German Patent Document DE 22 57 176 C3, a brake disk is known for a friction brake which also has curved cooling air ducts. In addition, perforations for improving the braking effect in wetness and an improved cooling effect are provided here in the friction disks.

Based on this state of the art, it is an object of the invention to create an internally ventilated brake disk which is improved with respect to the rate of air flow for the brake disk cooling and with respect to the strength of the brake disk.

This object is achieved according to certain preferred embodiments of the invention by providing an internally ventilated brake disk comprising two friction rings which are mutually connected by way of webs ducts for conducting cooling air formed between the webs and the two friction rings extending in a curved manner between their end regions, wherein end regions of the webs pointing to an outer circumference area of the brake disk are aligned essentially radially to the brake disk, wherein end regions of the webs pointing to an inner circumference side of the brake disk are set at an angle of from 20° to 70°, with respect to a tangent ray which is applied to this point on the brake disk and points against a rotating direction of the brake disk. In the case of a brake disk, which comprises two friction rings mutually connected by way of webs, it is suggested according to the invention to construct the curved webs such that they are essentially radially aligned at the outer circumference of the brake disk, while, at the inner circumference of the brake disk, that is, in the region of the cooling air entry, they are sloped by an angle of from 20° to 70° with respect to a tangent placed at this point of the inner circumference against the rotating direction of the brake disk. According to certain preferred embodiments this angle at the entry side amounts to 30° to 60° with respect to the tangent.

The invention is based on the recognition that a radially aligned web in comparison to differently aligned webs has the highest strength. Since this measure is applied in the region of the outer circumference of the brake disk, which is particularly stressed by the rotation of the brake disk, the effect of this strength-increasing measure is particularly great.

Furthermore, advantageously, the highest static pressure increase can be achieved according to preferred embodiments of the invention by means of a radially ending web by way of a cooling duct formed between the webs. A high static pressure increase is a prerequisite for creating a rate of air flow which is as high as possible for cooling the brake disk.

The entry angle, that is, the angle of the end region of the webs pointing to the inner circumference of the brake disk, is selected such that the initial direction of the web coincides as well as possible with the direction of the approaching cooling air in order to achieve a rate of air flow in this manner which is as high as possible.

Advantageous further developments of the invention are described below and in the claims.

It is suggested according to certain preferred embodiments of the invention that some of the webs be constructed as so-called primary webs, these primary webs forming fastening eyes on their end region facing the inner circumference of the brake disk. These fastening eyes are used for receiving fastening devices, for example, screwed connections for connecting the brake disk with a brake chamber, a wheel bearing or the like. Secondary webs are arranged between the primary webs and are used mainly for the air conduction and the mutually supporting of the two friction rings. Their end region facing the inner circumference of the brake disk is set back with respect to the end region of the primary webs in order to keep the cross-sectional surface for the entry of the cooling air available at the inner circumference of the brake disk as large as possible.

Furthermore, it is suggested according to certain preferred embodiments of the invention to ensure the overlapping of the webs in the radial direction of the brake disk by the selection of the parameters
number of webs (mainly primary and secondary webs)
selection of the entry angle of the webs and
selection of the width of the webs.

In addition, tertiary webs may be provided according to certain preferred embodiments of the invention which, in particular, are arranged in the region of the brake disk pointing to the outer circumference. Their end region facing the inner circumference of the brake disk is set back with respect to the end region of the secondary webs in order not to impair the cross-sectional surface available in the air ducts. The tertiary webs further improve the axial supporting of the friction rings, and, in this manner, the bending of the friction rings is reduced under the forces which are axially applied to the brake disk by means of the brake pads during the braking operation.

Furthermore, additional webs can be provided according to certain preferred embodiments of the invention. Such a requirement exists particularly if the axial support of the friction rings is to be further improved. Also, by means of additional webs, the surface in the air ducts can be increased which is effective for the cooling. Instead of additional webs, ribs may also be provided which extend from the interior sides of the friction rings into the air ducts.

To the extent that perforation bores are provided in the friction rings, these are arranged in one or two rows approximately parallel to the webs inside the air ducts according to certain preferred embodiments of the invention. In this case, the perforation bores are preferably arranged away from the flank of the webs pointing in the rotating direction of the brake disk, since on this flank, viewed in the circumferential direction, in each case, the highest pressure increase takes place in the air duct, which pressure increase is not to be impaired by perforation bores. In addition, preferably in the area of the highest static loads in the friction rings, that is, in the proximity of the inner circumference of the brake disk, no more perforation bores are arranged in the air duct. As a result of this measure, the risk of cracks can be reduced in this particularly stressed area.

According to certain preferred embodiments of the invention, especially for brake disks made of a fiber-reinforced composite material, for example, made of a silicon-infiltrated carbon-fiber-reinforced carbon C/CSiC (compare German Patent Document DE 44 38 455 (corresponding U.S. Pat. No. 6,086,814)), it is suggested, for reasons of strength, to select the wall thickness of the webs to be at least 10 mm and to design the fastening eyes of the webs such that the outside diameter of the fastening eyes is at least twice as large as its inside diameter. This contributes to the improved stability of the brake disk and to the improved strength of the linking of the brake disk.

The above-described construction principles can be used for internally ventilated brake disks, generally irrespective of their construction type. They can therefore be applied particularly to brake disks constructed in one or two parts and to a variety of materials, particularly for gray cast iron and composite ceramics, such as C/CSiC, and carbon fiber reinforced carbon.

In the following, the invention will be explained in detail by means of an embodiment illustrated in the figures.

Other objects, advantages and novel features of the present invention will become apparent from the following detailed description of the invention when considered in conjunction with the accompanying drawings.

DETAILED DESCRIPTION OF THE DRAWINGS

Figure 1:
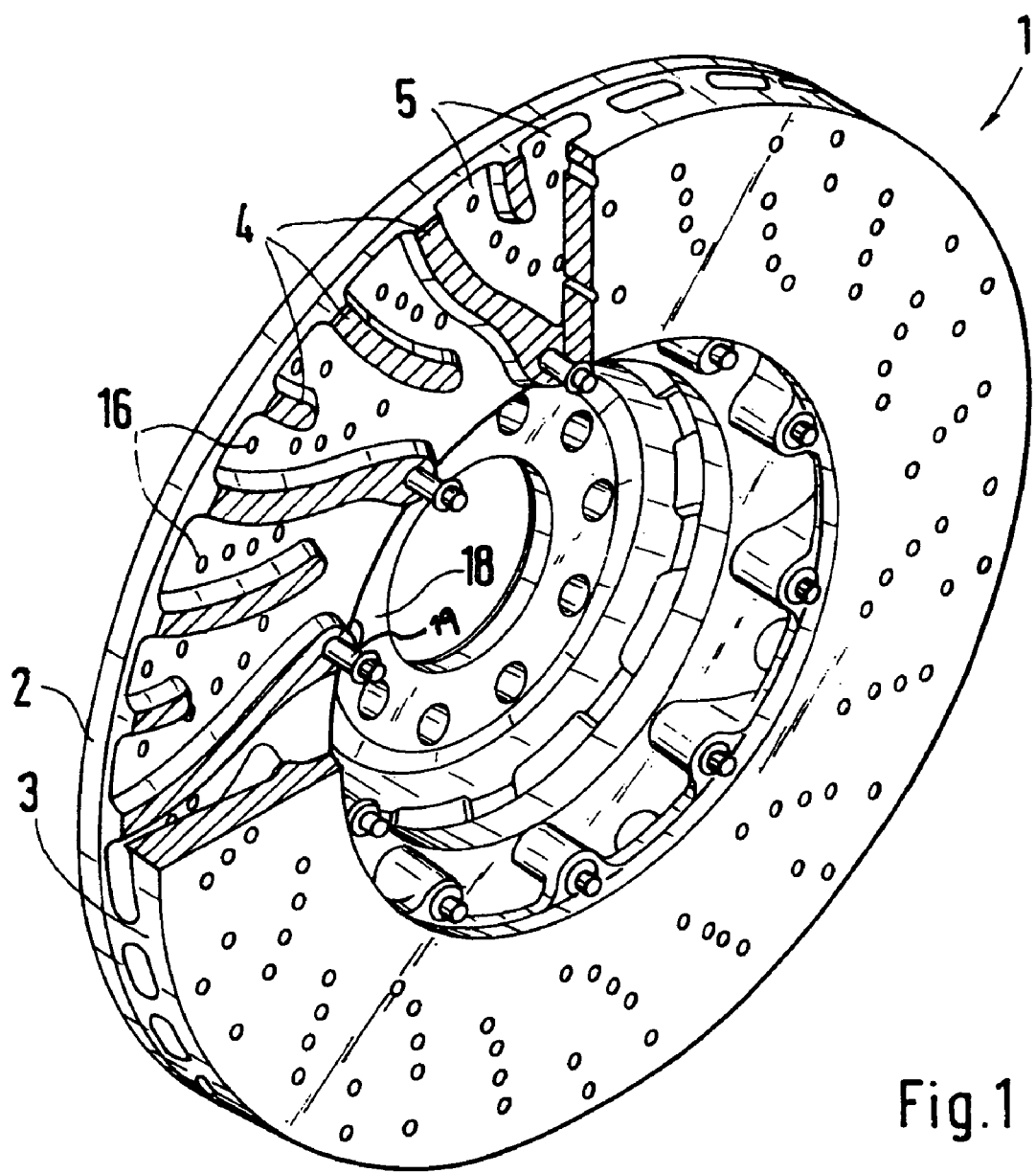
FIG. 1 is a diagonal view of an internally ventilated brake disk, with a partially opened-up representation, constructed according to certain preferred embodiments of the invention.

FIG. 1 is a diagonal view of an internally ventilated brake disk 1 which is opened up in a partial area. Between two friction rings 2, 3 with plane-parallel outer surfaces, webs 4 are arranged which in the following will be called blades and between which air ducts 5 are formed for conducting cooling air. In addition to the primary blades 4a, secondary blades 4b and tertiary blades 4c are provided. The primary blades 4a extend in an S-shaped curved manner between a blade start 6 on the inside diameter d1 of the brake disk 1 and a blade end 7 on the outside diameter d2 of the brake disk 1. In the partial view according to FIG. 2, a cutout of the brake disk 1 is again shown in an opened-up representation.

Figure 2:
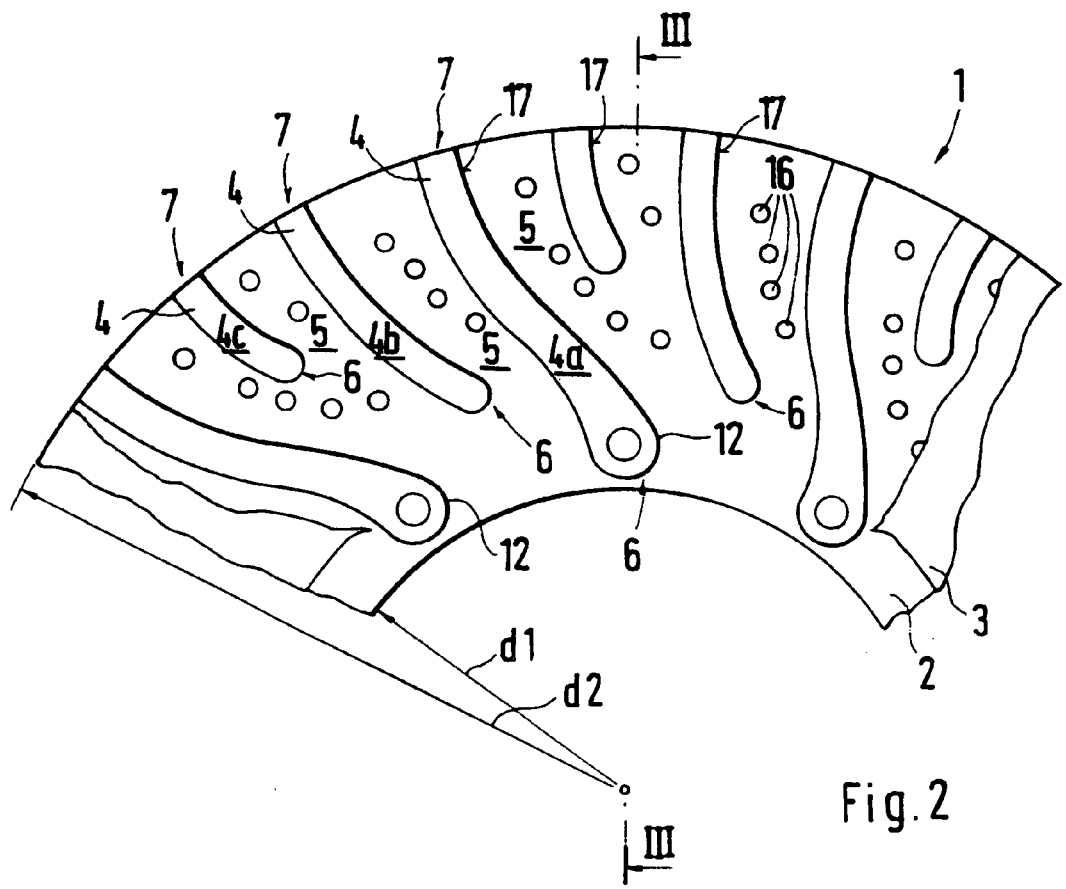
FIG. 2 is a partial view of the brake disk of FIG. 1, with a partially opened-up representation.
Figure 3:
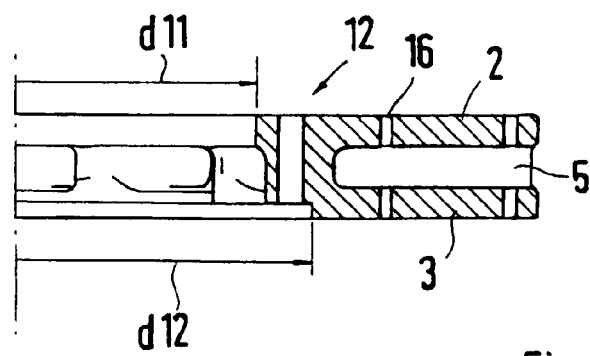
FIG. 3 is a sectional view according to Line III—III of FIG. 2.

FIG. 3 is a sectional view according to Line III—III of FIG. 2. It is shown here that the friction rings 2,3 have different inside diameters d11 and d12, which, in the embodiment shown, leads to an enlargement of the surface of the air ducts 5 in the entry region of the air flow.

Figure 4:
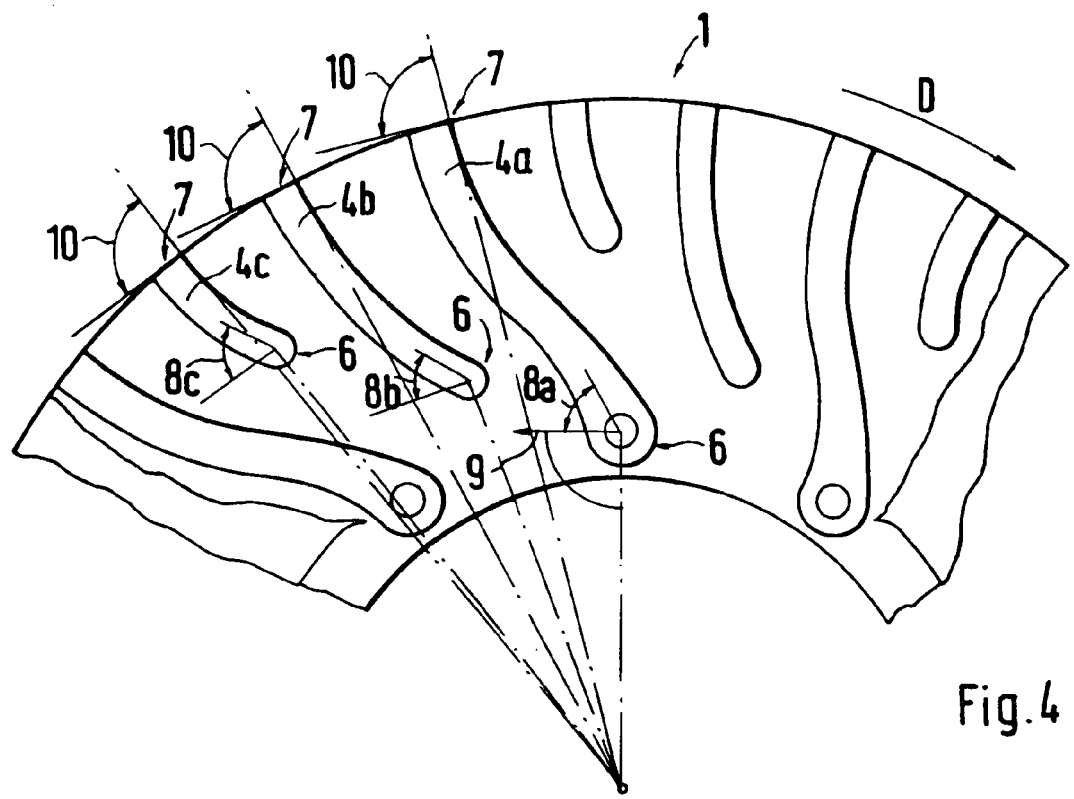
FIG. 4 is a partial view according to FIG. 2 with angle data.

FIG. 4 shows the different angles relevant to the arrangement of the blades 4 in the representation according to FIG. 2. In this case, the rotating direction of the brake disk 1 is marked D. All angle data refer in each case to a tangent (for example, tangent ray 9) against the rotating direction D. The blade end angle 10 for all blades 4 uniformly amounts to 90°; that is, the blade ends 7 are radially aligned in a uniform manner. The blade starting angles 8 are selected as follows:

For the primary blades 4a: Blade starting angle 8a, 50° to 70°, preferably 50°;

for the secondary blades 4b: blade starting angle 8b, 40° to 60°, preferably 50°;

for the tertiary blades 4c: blade starting angle 8c, 50° to 70°, preferably 60°.

The start 6 of the secondary blades 4b and of the tertiary blades 4c, relative to the flow in the air duct 5, is in each case set back with respect to the start 6 of the primary blades 4a, in order to provide a cross-sectional surface which is as large as possible in the region of the cooling air entry into the air duct 5. The primary blades 4a are curved in an S-shape in order to, in the area of the start 6 of the secondary blades 4b, divide the air duct 5 corresponding to the air currents to be expected into two partial regions with a rate of air flow which is as large as possible. In the embodiment shown, the secondary blades 4b and the tertiary blades 4c are curved only once.

In the case of the secondary blades 4b and the tertiary blades 4c, the blade width 11 is in each case selected to be constant or increases slightly from the start 6 of the blade toward the blade end 7. In contrast, in the case of the primary blades 4a, a fastening eye 12 in each case arranged at the start 6 of the blade forms the largest blade width 11 which then first diminishes, starting from the fastening eye 12. The blade width 11 can then increase again toward the blade end 7. The fastening eye 12 is used for connecting the brake disk 1 with the brake chamber 18 (see FIG. 1), a wheel carrier, or the like. Normally, a screw 19 or a sleeve is fitted through the fastening eye 12.

Figure 5:
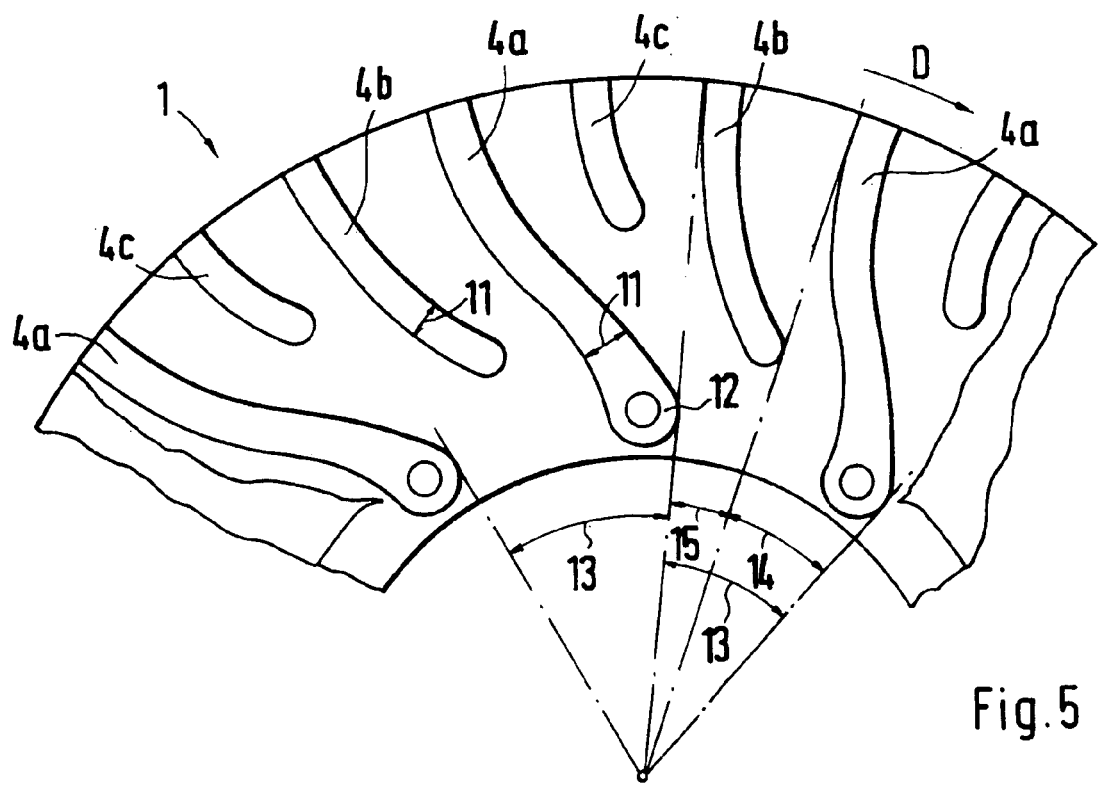
FIG. 5 is a partial view according to FIG. 2, with data concerning the overlapping.

For the strength of the brake disk 1 as a whole, it is important according to certain preferred embodiments, that an overlapping is achieved by means of the blades 4 in the radial direction of the brake disk 1. The arrangement of the blades 4 for achieving the overlapping is illustrated in detail in FIG. 5. In the embodiment shown, ten primary blades 4a are provided so that a pitch angle 13 of 36° is formed between two primary blades 4a. The primary blades 4a overlap the pitch angle 13 by approximately ⅔. In the present embodiment, a first pitch angle 14 of 23° is covered by the primary blades 4a. The secondary blades 4b are arranged such that, against the rotating direction D and relative to the angle of circumference of the brake disk 1, their blade start 6 adjoins the blade end 7 of the primary blades 4a. The secondary blades 4b overlap the remaining pitch angle 15 of 13°.

In the embodiment shown, the tertiary blades 4c make no direct contribution to the overlapping in the radial direction. On the contrary, it is an object of the tertiary blades 4c to mutually support the two friction rings 2, 3 between the secondary blades 4b and the primary blades 4a in order to avoid a bending of the friction rings 2, 3 under the forces applied axially to the brake disk 1 by not shown brake linings during the braking operation. For this purpose, the blade ends 7 of all blades 4 are arranged essentially at the same distance on the outside diameter d2.

In the region of the air ducts 5, perforation bores 16 are arranged in each case in an opposed manner in the friction rings 2 and 3. The perforation bores 16 are preferably arranged inside the air ducts 5 approximately parallel to the blades 4 such that they always have a minimum distance to the flank 17 of the blades 4 pointing in the rotating direction D. In the proximity of the inside diameter d1 of the brake disk 1, no more perforation bores 16 are provided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An internally ventilated brake disk comprising:
   two friction rings spaced apart and connected to one another by a plurality of primary, secondary and tertiary webs, wherein
   channels formed between the primary webs are arranged to conduct cooling air from radially inner end regions of the primary webs toward an outer circumference of the brake disk,
   the primary webs extend in a curved manner between the radially inner end regions to radially outer end regions of the primary webs,
   the primary web radially outer ends are oriented essentially radially with respect to the brake disk,
   the primary web inner end regions are oriented at an angle between 30° and 60° with respect to a tangential line at an inner radius of the brake disk,
   one of the secondary webs and one of tertiary webs are located between each pair of adjacent primary webs,
   inner end regions of the secondary webs begin at a distance radially outward relative to the inner end regions of the primary webs,
   inner end regions of the tertiary webs begin at a distance radially outward relative to the inner end regions of the secondary webs,
   all web outer end regions are positioned essentially equidistant from one another in a circumferential direction about the brake disk, and
   the radially inner end region of said secondary web located between adjacent primary webs is located closer to the one of the adjacent primary webs which is next to said secondary web, than to the primary web immediately adjacent to the tertiary web, such that air flow in each channel is approximately equal.

2. The internally ventilated brake disk according to claim 1, wherein
   the primary webs inner end regions include fastening eyes.

3. The internally ventilated brake disk according to claim 1, wherein
   a width of the webs, a number of webs, and the inlet angle are selected so that the webs overlap as viewed in the radial direction of the brake disk.

4. The internally ventilated brake disk according to claim 2, wherein
   a width of the webs, a number of webs, and the inlet angle are selected so that the webs overlap as viewed in the radial direction of the brake disk.

5. The internally ventilated brake disk according to claim 1, wherein
   perforation holes are provided in the friction rings, and
   no perforation hole is located in a region of greatest static air pressure increase the channels.

6. The internally ventilated brake disk according to claim 1, wherein
   the brake disk is formed from a silicon-infiltrated carbon fiber-reinforced carbon,
   the primary webs inner end regions include fastening eyes,
   a width of the primary and secondary webs is at least 10 mm, and an outer diameter of the fastening eyes is at least twice as great as an inner diameter of the fastening eyes.

7. The internally ventilated brake disk according to claim 1, wherein
   the primary webs are curved in an S-shaped manner between the radially inner end regions to radially outer end regions of the primary webs.

* * * * *